US007850084B2

(12) United States Patent
Yamamoto

(10) Patent No.: US 7,850,084 B2
(45) Date of Patent: Dec. 14, 2010

(54) COMPUTER APPARATUS

(75) Inventor: Kensaku Yamamoto, Saitama (JP)

(73) Assignee: Ricoh Company, Ltd., Tokyo (JP)

(*) Notice: Subject to any disclaimer, the term of this patent is extended or adjusted under 35 U.S.C. 154(b) by 466 days.

(21) Appl. No.: 11/741,245

(22) Filed: Apr. 27, 2007

(65) Prior Publication Data

US 2007/0284437 A1 Dec. 13, 2007

(30) Foreign Application Priority Data

May 9, 2006 (JP) ............................ 2006-130551
Apr. 11, 2007 (JP) ............................ 2007-104049

(51) Int. Cl.
*G06K 7/10* (2006.01)
*G06K 7/14* (2006.01)

(52) U.S. Cl. ............ 235/454; 235/462.01; 235/462.09; 713/2

(58) Field of Classification Search ................ 235/439, 235/449, 454, 487, 492; 705/50, 51; 713/1, 713/2; 358/1.1; 283/72
See application file for complete search history.

(56) References Cited

U.S. PATENT DOCUMENTS 5,982,520 A * 11/1999 Weiser et al. ............... 398/126
6,449,642 B2 * 9/2002 Bourke-Dunphy et al. .. 709/222
6,771,820 B1 * 8/2004 Oakeson ..................... 382/232
7,156,307 B2 * 1/2007 Stadelmann et al. ........ 235/454
7,225,440 B2 * 5/2007 Himmel et al. ............. 717/168
7,246,748 B1 * 7/2007 Feuerman et al. ...... 235/462.09
2003/0140009 A1 * 7/2003 Namba et al. ................. 705/59
2003/0225700 A1 12/2003 Lao et al.
2003/0231368 A1 12/2003 Nelson et al.
2003/0236973 A1 12/2003 Nelson et al.
2005/0135856 A1 * 6/2005 Uchida et al. ............... 399/411
2006/0026105 A1 * 2/2006 Endoh ......................... 705/59

FOREIGN PATENT DOCUMENTS

JP 1-181370 7/1989
JP 3059643 4/2000
JP 2004-179780 6/2004
JP 2007-26110 2/2007
WO 2004/036409 4/2004

* cited by examiner

*Primary Examiner*—Thien M. Le
*Assistant Examiner*—William M Anderson, Jr.
(74) *Attorney, Agent, or Firm*—Oblon, Spivak, McClelland, Maier & Neustadt, L.L.P.

(57) ABSTRACT

A computer apparatus includes an equipment-information holding unit which holds equipment information which contains setting information of equipment of the computer apparatus and license information for using the equipment. An image-data generating unit generates image data for printing the equipment information on a sheet in a predetermined form. An equipment-information setting unit stores the equipment information into the equipment-information holding unit based on image data read from the printed sheet on which the equipment information is printed.

15 Claims, 21 Drawing Sheets

FIG.2

| | CHANGE | DELETION | DIVISION | COPY | PRINT/READ METHOD |
|---|---|---|---|---|---|
| FIXED INFORMATION<br>-NETWORK SETTING<br>-DESTINATION TABLE | INHIBITED | INHIBITED | INHIBITED | ALLOWED | BAR CODE |
| VARIABLE INFORMATION<br>-TRAY SETTING<br>-COMMENTS | ALLOWED | ALLOWED | INHIBITED | ALLOWED | OCR, OMR |
| LICENSE INFORMATION | INHIBITED | ALLOWED | ALLOWED | INHIBITED | GROUND-TINT |

FIG.3

LICENSE INFORMATION HOLDING UNIT

102

CONTROL PART

LICENSE TABLE

| ID | APPLICATION PROGRAM NAME | LICENSE INFORMATION |
|---|---|---|
| 1 | APPLICATION-1 | 55F83-3A5B-0011803-00A04 |
| 2 | APPLICATION-2 | 176101-215552-539822-065122-219111-233225-644026 |
| 3 | APPLICATION-3 | 9D0D53DAE306 |
| ... | ... | ... |

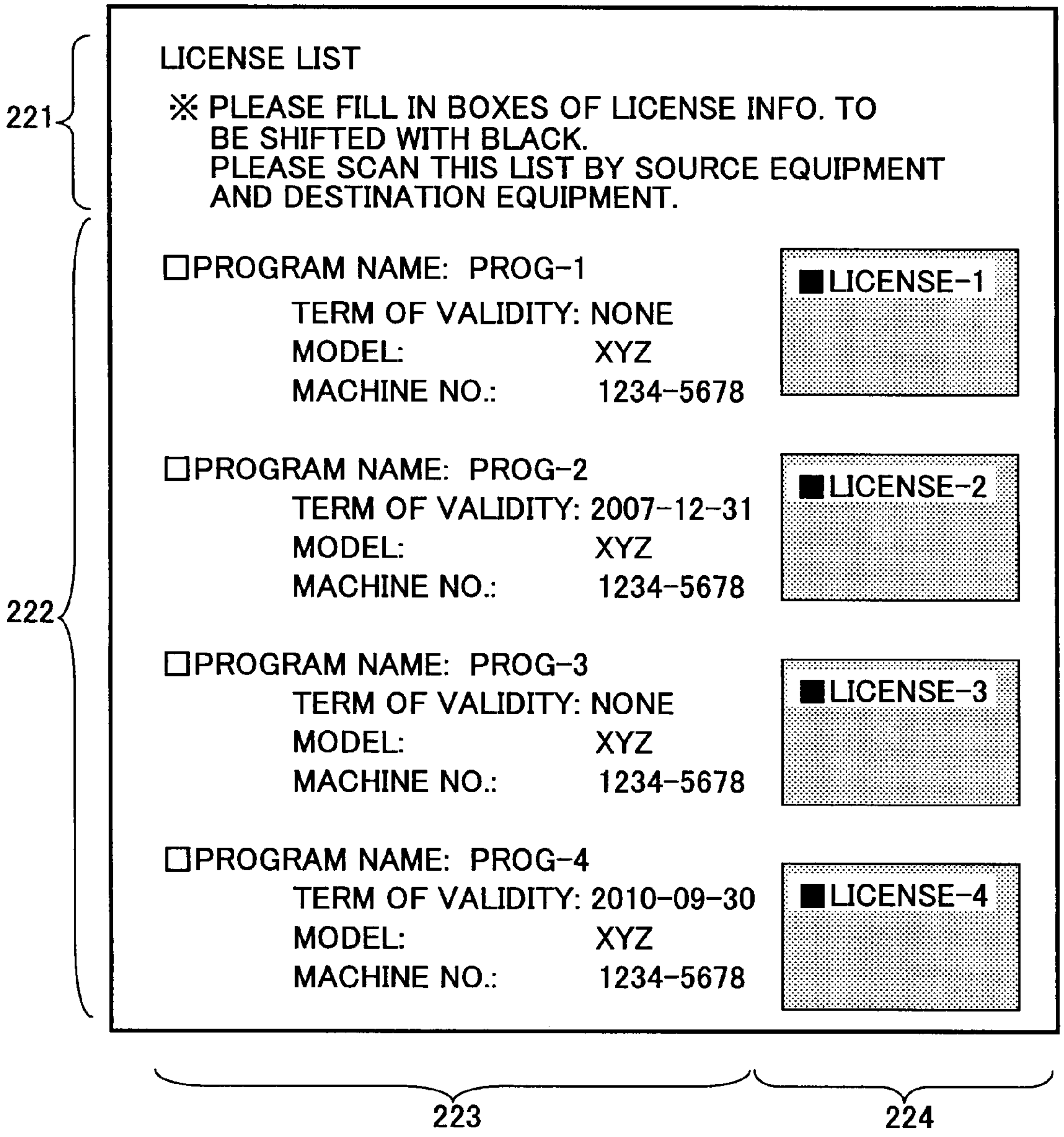

FIG.12

LICENSE LIST

※ PLEASE FILL IN BOXES OF LICENSE INFO. TO BE SHIFTED WITH BLACK.
PLEASE SCAN THIS LIST BY SOURCE EQUIPMENT AND DESTINATION EQUIPMENT.

☐PROGRAM NAME: PROG-1
    TERM OF VALIDITY: NONE
    MODEL:         XYZ
    MACHINE NO.:   1234-5678

■LICENSE-1

☐PROGRAM NAME: PROG-2
    TERM OF VALIDITY: 2007-12-31
    MODEL:         XYZ
    MACHINE NO.:   1234-5678

■LICENSE-2

☐PROGRAM NAME: PROG-3
    TERM OF VALIDITY: NONE
    MODEL:         XYZ
    MACHINE NO.:   1234-5678

■LICENSE-3

☐PROGRAM NAME: PROG-4
    TERM OF VALIDITY: 2010-09-30
    MODEL:         XYZ
    MACHINE NO.:   1234-5678

■LICENSE-4

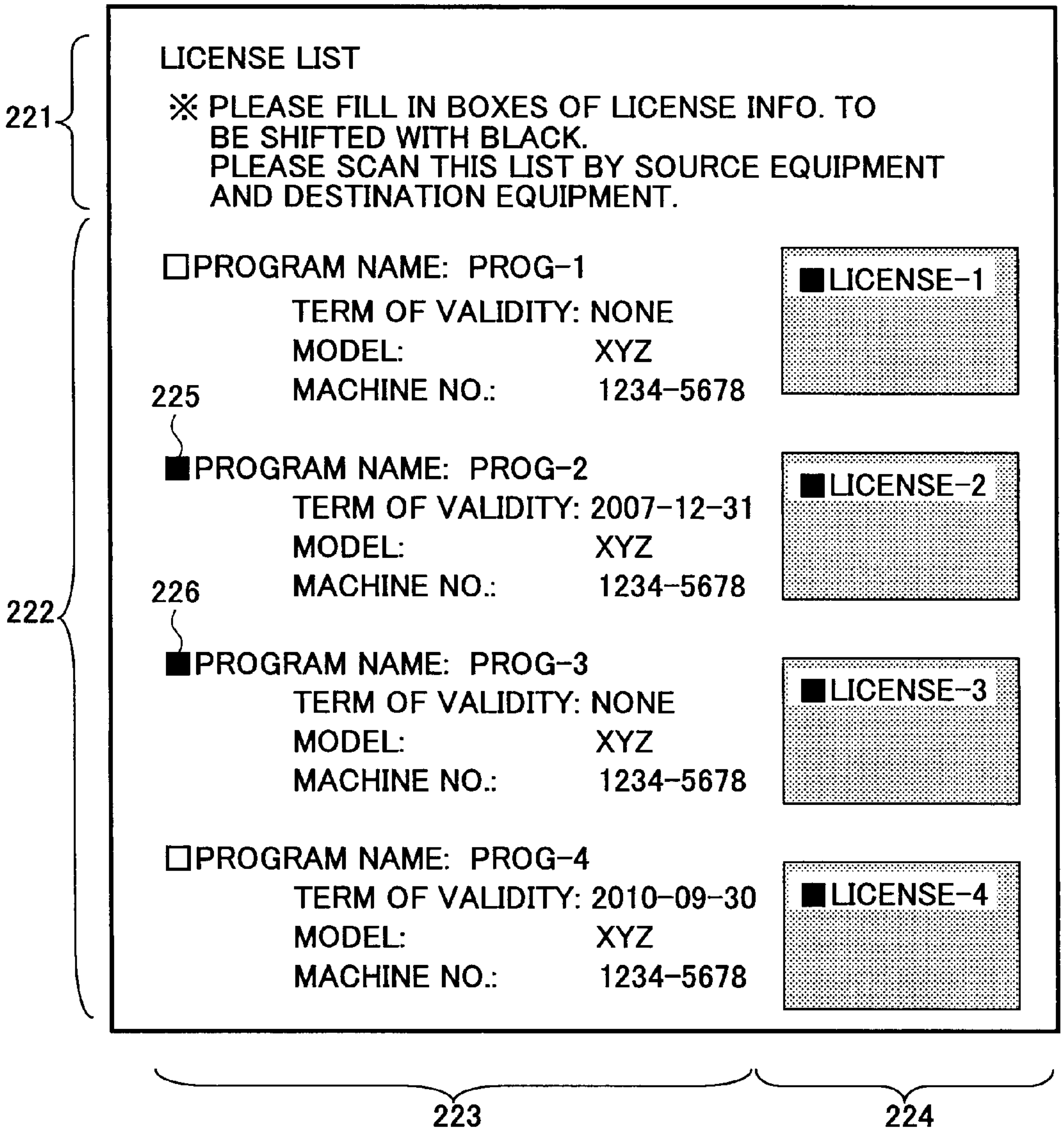

FIG.13

221 { LICENSE LIST
※ PLEASE FILL IN BOXES OF LICENSE INFO. TO BE SHIFTED WITH BLACK.
PLEASE SCAN THIS LIST BY SOURCE EQUIPMENT AND DESTINATION EQUIPMENT.

222 {
☐PROGRAM NAME: PROG-1
    TERM OF VALIDITY: NONE
    MODEL: XYZ
225  MACHINE NO.: 1234-5678   ■LICENSE-1

■PROGRAM NAME: PROG-2
    TERM OF VALIDITY: 2007-12-31
    MODEL: XYZ
226  MACHINE NO.: 1234-5678   ■LICENSE-2

■PROGRAM NAME: PROG-3
    TERM OF VALIDITY: NONE
    MODEL: XYZ
    MACHINE NO.: 1234-5678   ■LICENSE-3

☐PROGRAM NAME: PROG-4
    TERM OF VALIDITY: 2010-09-30  ■LICENSE-4
    MODEL: XYZ
    MACHINE NO.: 1234-5678

223    224

241 {
LICENSE LIST

※ PLEASE FILL IN BOXES OF LICENSE INFO. TO
  BE DELETED WITH BLACK.

242 {
☐PROGRAM NAME:  PROG-1
        TERM OF VALIDITY: NONE
        MODEL:            XYZ
        MACHINE NO.:      1234-5678

☐PROGRAM NAME:  PROG-2
        TERM OF VALIDITY: 2007-12-31
        MODEL:            XYZ
        MACHINE NO.:      1234-5678

☐PROGRAM NAME:  PROG-3
        TERM OF VALIDITY: NONE
        MODEL:            XYZ
        MACHINE NO.:      1234-5678

☐PROGRAM NAME:  PROG-4
        TERM OF VALIDITY: 2010-09-30
        MODEL:            XYZ
        MACHINE NO.:      1234-5678

COMPUTER APPARATUS

BACKGROUND OF THE INVENTION

1. Field of the Invention

This invention relates to a computer apparatus, such as a MFP (multi-function peripheral), in which a built-in computer is incorporated.

2. Description of the Related Art

In a computer apparatus, such as a MFP, replacement of an existing model with a new model has often been performed. However, various kinds of equipment information are stored within the computer apparatus, and this equipment information contains setting information of equipment (including hardware and software resources) of the computer apparatus, and license information for using the equipment, such as application programs. In the case of a MFP, the setting information may include a recording sheet setup, a tray setup, a power-saving setup, a network setup, a FAX/MAIL address table, etc. It is necessary to transfer such information from the existing equipment to new equipment when the replacement is performed.

Conventionally, a MFP having a built-in function of printing setting information is known. If such a MFP is used for performing the replacement, the setting information is printed on a sheet by the existing model, and re-setting of the new model is performed manually while viewing the setting information of the printed sheet. As for a FAX/MAIL address and license information which are not printed out by the built-in function, such equipment information must be received by a different method and inputted to the new MFP manually. If a MFP having no function of printing setting information is used, it is necessary to acquire all the equipment information by a different method and perform re-setting of the new model manually.

On the other hand, an image processing device, such as a facsimile, which is not relevant to the replacement of computer apparatus but adapted to easily carry out a complicated setup based on marks recorded in a recording sheet in a predetermined format is disclosed in some publications: Japanese Laid-Open Patent Application No. 1-181370, Japanese Patent No. 3059643, Japanese Laid-Open Patent Application No. 2004-179780.

As mentioned above, it has been necessary to transfer equipment information, including setting information and license information, from the existing machine to the new machine by manual setting. The transferring operation is complicated and a setting error takes place in many cases, thereby causing a malfunction of the computer apparatus.

The technology disclosed in the above publications does not assume replacement of computer apparatus, and does not teach outputting the equipment information from the existing machine.

If replacement of a plurality of existing models with a plurality of new models is dealt with, from which existing model and to which new model the setting information should be transferred must be taken into consideration. However, an efficient technique is not found out.

Similarly, there is a need to divide a plurality of application programs installed in one computer apparatus, into some program groups, and install the program groups in a plurality of computer apparatuses respectively. In this case, also the license information of the programs must be divided and transferred to the plurality of computer apparatuses. However, an efficient technique for division of the license information in that case is not found out.

Not only for the replacement from existing model to new model, there is also a need to transfer a part of license information for using the equipment, such as application programs, from the source device to the destination device. However, an efficient technique for transferring the license information in that case is not found out. Similarly, an efficient technique for management of the license information at the installation or uninstallation of application programs to a computer apparatus is not found out.

SUMMARY OF THE INVENTION

According to one aspect of the invention, there is provided an improved computer apparatus in which the above-described problems are eliminated.

According to one aspect of the invention there is provided a computer apparatus which can efficiently manage equipment information including setting information and license information.

In an embodiment of the invention which solves or reduces one or more of the above-mentioned problems, there is provided a computer apparatus comprising: an equipment-information holding unit holding equipment information which contains setting information of equipment of the computer apparatus and license information for using the equipment; an image-data generating unit generating image data for printing the equipment information on a sheet in a predetermined form; and an equipment-information setting unit storing the equipment information into the equipment-information holding unit based on image data read from the printed sheet on which the equipment information is printed.

The above-mentioned computer apparatus may be configured to further comprise: an equipment-information printing application controlling processing to print the equipment information on a sheet in the predetermined form; an encoder unit encoding the equipment information being included in the image data; an image generation unit generating image data to be printed; and a plotter unit performing printing of the image data on a sheet.

The above-mentioned computer apparatus may be configured to further comprise: an equipment-information setting application controlling processing to read a printed sheet on which the equipment information is printed, and to perform storing of the equipment information; a scanner unit performing optical reading of a sheet; an image-analysis unit analyzing the read image data and performing recognition of marks and characters to extract codes of the equipment information; and a decoder unit decoding the codes of the equipment information into the equipment information.

The above-mentioned computer apparatus may be configured so that the image-data generating unit of existing equipment is provided to print the equipment information, held by the equipment-information holding unit, on a sheet in the predetermined form, and the equipment-information setting unit of new equipment is provided to store the equipment information into the equipment-information holding unit of the new equipment based on image data read from the printed sheet.

The above-mentioned computer apparatus may be configured so that the image-data generating unit of source equipment is provided to print the license information, held by the equipment-information holding unit, on a sheet in the predetermined form, and the equipment-information setting unit of destination equipment is provided to store the license information into the equipment-information holding unit of the destination equipment based on image data read from the printed sheet on which the license information to be transferred to the destination equipment is specified.

The above-mentioned computer apparatus may be configured so that the equipment-information setting unit is provided to store the license information into the equipment information holding unit based on image data read from a license certificate.

The above-mentioned computer apparatus may be configured so that the image-data generating unit is provided to print the license information, held by the equipment-information holding unit, on a sheet in the predetermined form, and wherein the equipment-information setting unit is provided to delete the license information in the equipment-information holding unit based on image data read from the printed sheet on which the license information being deleted is specified.

In an embodiment of the invention which solves or reduces one or more of the above-mentioned problems, there is provided an equipment-information management method for use in a computer apparatus, the method comprising steps of: generating image data for printing equipment information, which contains setting information of equipment of the computer apparatus and license information for using the equipment, on a sheet in a predetermined form; and storing the equipment information into the equipment of the computer apparatus or equipment of another computer apparatus based on image data read from the printed sheet on which the equipment information is printed.

According to the embodiment of the computer apparatus of the invention, the equipment information is outputted to a recording sheet in a predetermined form that can be read by the computer device, entry or processing to the recording sheet is manually performed appropriately, and image data of the equipment information is read from the processed sheet so that the equipment information is automatically stored in a new computer apparatus. Therefore, the equipment information, including the setting information and the license information, can be efficiently managed.

BRIEF DESCRIPTION OF THE DRAWINGS

Other objects, features and advantages of the present invention will be apparent from the following detailed description when reading in conjunction with the accompanying drawings.

FIG. 2 is a diagram showing an example of classification of equipment information.

FIG. 3 is a diagram showing the composition of a license-information holding unit.

FIG. 12 is a diagram showing an example of a printed recording sheet.

FIG. 13 is a diagram showing an example of the entry to the printed recording sheet.

DETAILED DESCRIPTION OF PREFERRED EMBODIMENTS

A description will be given of embodiments of the invention with reference to the accompanying drawings.

Figure 1:
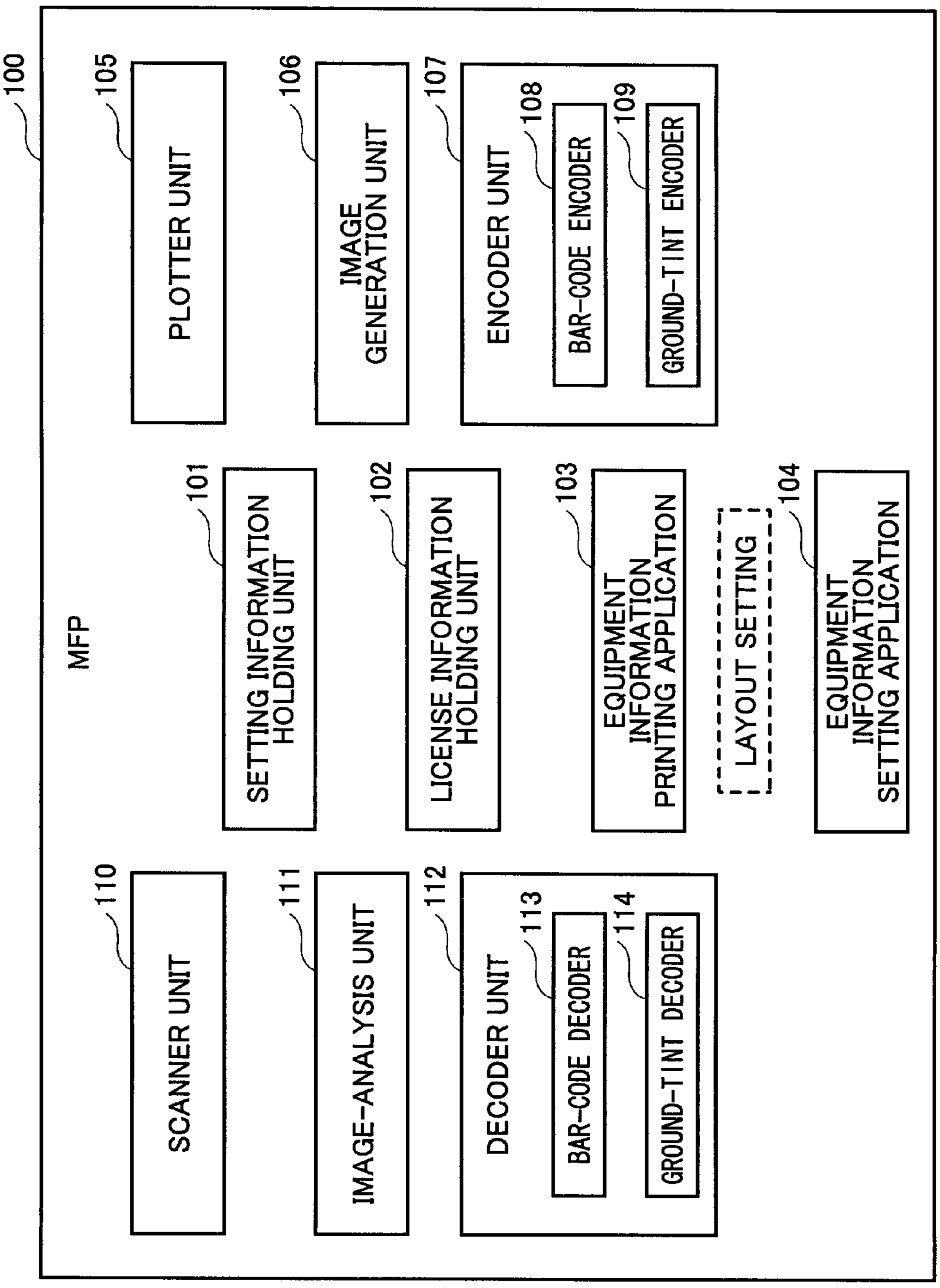
FIG. 1 is a block diagram showing the composition of a multi-function peripheral MFP in an embodiment of the invention.

The composition of a computer apparatus in an embodiment of the invention will be explained. FIG. 1 shows the composition of a multi-function peripheral (MFP) in an embodiment of the invention.

As shown in FIG. 1, the MFP 100 is provided with the following elements. A setting-information holding unit 101 is configured to hold setting information including a recording sheet setting, a tray setting, a power-saving setting, a network setting, a FAX/MAIL destination table, etc. A license-information holding unit 102 is configured to hold license information of application programs. An equipment-information printing application 103 is configured to perform printing processing to print equipment information (setting information, license information) on a recording sheet in a predetermined form.

Moreover, the MFP 100 is provided with an equipment-information setting application 104 which is configured to read image data from a printed recording sheet on which the equipment information is printed, and performs storing of the equipment information into the MFP 100 based on the image data. When printing of image data on a recording sheet and reading of image data from a recording sheet are performed, a layout setting which indicates the position of each of items on the recording sheet is referred to.

When printing of image data on a plurality of forms of recording sheets and reading of image data from a plurality of forms of recording sheets are performed, a plurality of layout settings are provided, and one of the plurality of forms is suitably selected and used at the time of printing or reading.

Moreover, the MFP 100 is provided with a plotter unit 105 which performs printing of image data on a recording sheet, an image generation unit 106 which generates image data to be printed, and an encoder unit 107 which encodes the equipment information being included in the image data. These units 105-107 serve as an image-data generating unit which generates image data for printing the equipment information on a recording sheet in a predetermined form.

The encoder unit 107 includes a bar-code encoder 108 for encoding image data into bar codes, such as QR code (registered trademark; a matrix-type two-dimensional code), a ground-tint encoder 109 for encoding image data into a ground tint (which is a code-embedded background image printed in a state that it is hard to be visible with the naked eye).

Moreover, the MFP 100 is provided with a scanner unit 110 which performs optical reading of a recording sheet, an image-analysis unit 111 which analyzes the read image data and performs recognition of marks and characters to extract codes of equipment information represented by the bar code or the ground tint, and a decoder unit 112 which decodes the codes of equipment information extracted from the image data, into the equipment information. These units 110-112 serve as a function part used for reading image data from a recording sheet. The decoder unit 112 includes a bar-code decoder 113 for decoding a bar code, such as QR code, into the equipment information, etc., and a ground-tint decoder 114 for decoding a ground tint into the equipment information, etc.

The MFP 100 in this embodiment has the plotter unit 105 and the scanner unit 110 as fundamental functions. When this invention is applied to a PC (personal computer), a PDA (personal digital assistant) or a cellular phone, the plotter unit 105 and the scanner unit 110 in the above embodiment may be replaced with an external printer and an external scanner for use in the PC, the PDA or the cellular phone. In addition, when this invention is applied to a scanner device, the computer apparatus 100 has the scanner unit 110 inside, but the plotter unit 105 may be replaced with an external printer. Similarly, when this invention is applied to a printer device, the computer apparatus 100 has the plotter unit 105 inside, but the scanner unit 110 may be replaced with an external scanner.

FIG. 2 shows an example of classification of the equipment information. As shown in FIG. 2, a network setting, a destination table, etc., among the setting information are the fixed information, and there is no necessity for changing (change of the contents of such information), deleting (deletion of the contents of such information), or dividing (division of such information over a plurality of devices). Copying the contents of such information (network setting, destination table, etc.) to a plurality of devices without change should be permitted. It is preferred to use a printing/reading method based on a bar code, such as QR code, for such information.

Among the setting information, a tray setting, comments, etc. are the variable information, and there is no necessity for the division. Changing, deleting and copying the contents of such information (tray setting, comments, etc.) should be permitted according to the environment of new equipment of a destination place. For this reason, it is preferred to use a printing/reading method based on an OCR (optical character reader) or OMR (optical mark reader), for such information. This printing is only printing of a frame, such as a selected column of a screen, and entry to a printed sheet is made by manual operation.

As for the license information among the setting information, changing and copying of the license information should not be permitted from a viewpoint of holding of the identity of license information and inhibiting the use of illegal license information. Deleting and dividing the license information should be permitted. It is preferred to use a printing/reading method based on a background ground tint, for such information.

FIG. 3 shows the composition of a license information holding unit 102 in the MFP 100 of FIG. 1. The license information holding unit 102 of FIG. 3 includes a control unit and a license table.

In a case of the license information of application programs, the license table contains an ID (identifier) which identifies the license information, a corresponding application program name, and a main part of the license information (license information main part).

In a case of the license information of plug-in software or service use, the license table contains a plug-in software or service name information which specifies the used plug-in software or service, instead of the application program name in FIG. 3. The ID and the license information main part in this case are the same as shown in FIG. 3.

A first operation pattern of the computer apparatus of the invention will be explained. The first operation pattern is applied to a case in which the equipment information is taken over from the existing equipment (the existing MFP) to new equipment (a new MFP).

Figure 4:
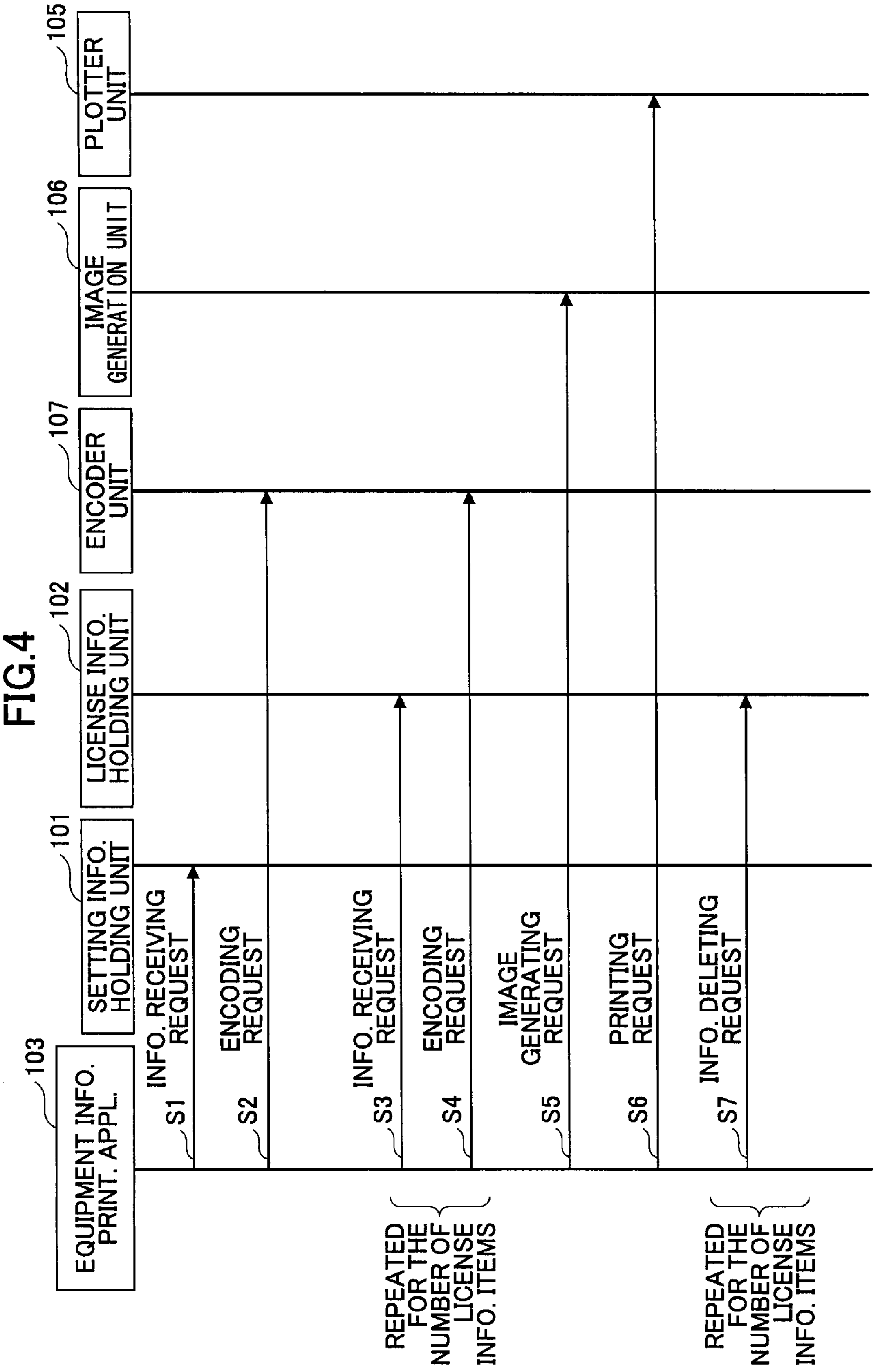
FIG. 4 is a sequence diagram for explaining an example of equipment-information printing processing.

FIG. 4 is a sequence diagram for explaining an example of equipment information printing processing. Upon start of the processing of FIG. 4, the equipment information printing application 103 of the MFP 100 on the side of the existing equipment requests receiving of setting information to the setting information holding unit 101 (step S1). The equipment information printing application 103 requests, to the encoder unit 107, encoding of the received setting information into a bar code or the like. (step S2).

Subsequently, the equipment information printing application 103 requests receiving of license information to the license information holding unit 102 (step S3). The equipment information printing application 103 requests, to the encoder unit 107, encoding of the received license information into a ground tint or the like (step S4).

The license-information receiving request and the encoding request are repeated for the number of license information items concerned.

Subsequently, the equipment information printing application 103 requests generation of image data including the encoded equipment information (including setting information and license information) to the image generation unit 106 (step S5). And the equipment information printing application 103 requests printing of the generated image data to the plotter unit 105 (step S6).

Subsequently, the equipment information printing application 103 requests deletion of the license information to the license information holding unit 102 (step S7). This deletion request is repeated for the number of license information items concerned.

The purpose of the deletion of the license information is that the license information should be taken over to the new equipment completely and leaving of the license information in the existing equipment should be avoided in order to prevent use of illegal license information.

Figure 5:
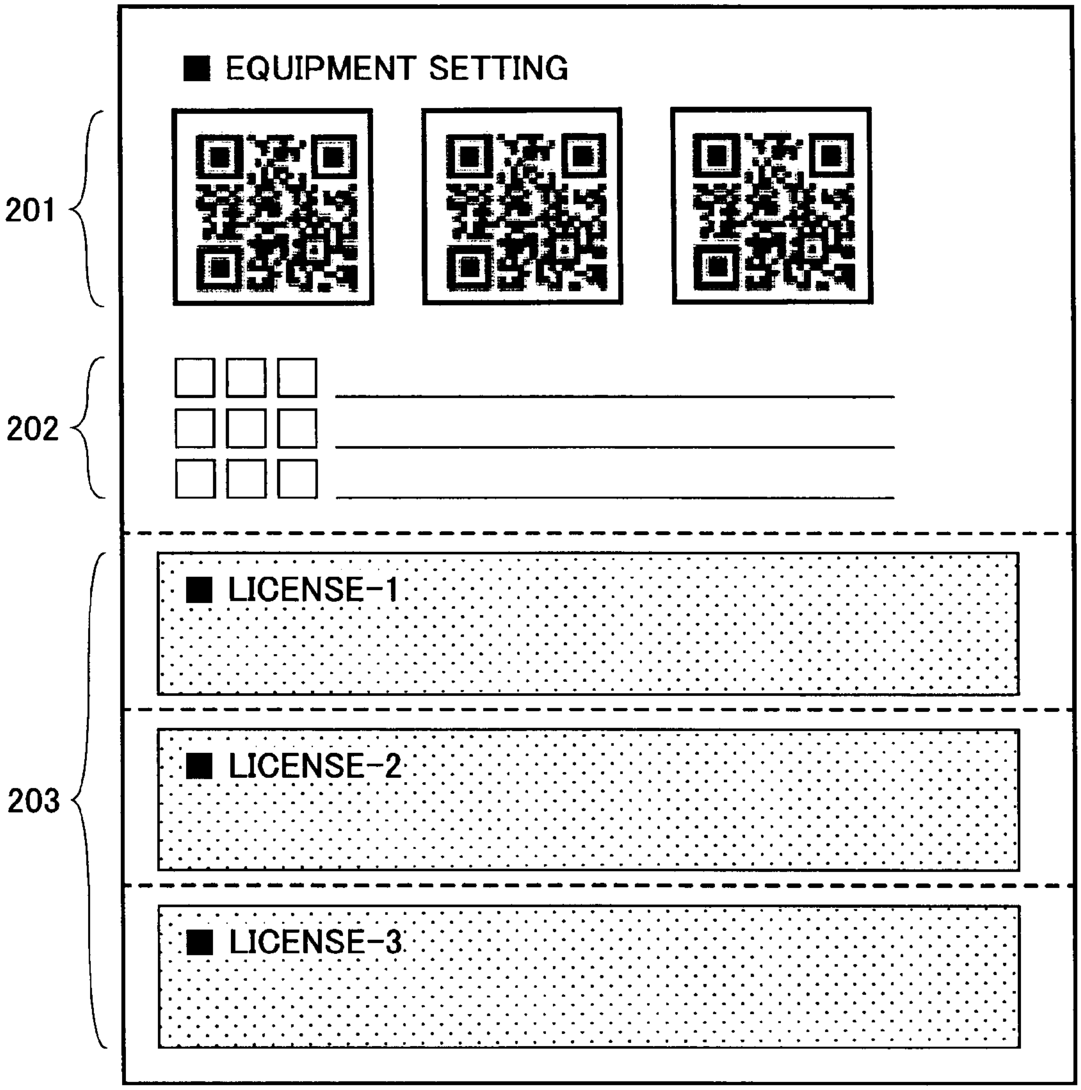
FIG. 5 is a diagram showing an example of a printed recording sheet.

FIG. 5 shows an example of a printed recording sheet. As shown in FIG. 5, some bar codes into which the setting information (equipment setting) is encoded are printed in an area 201 on this recording sheet. A mark entry column and a text entry column are printed in an area 202 on the recording sheet. And some ground tint patterns into which the license information is encoded are printed in an area 203 on the recording sheet.

Figure 6:
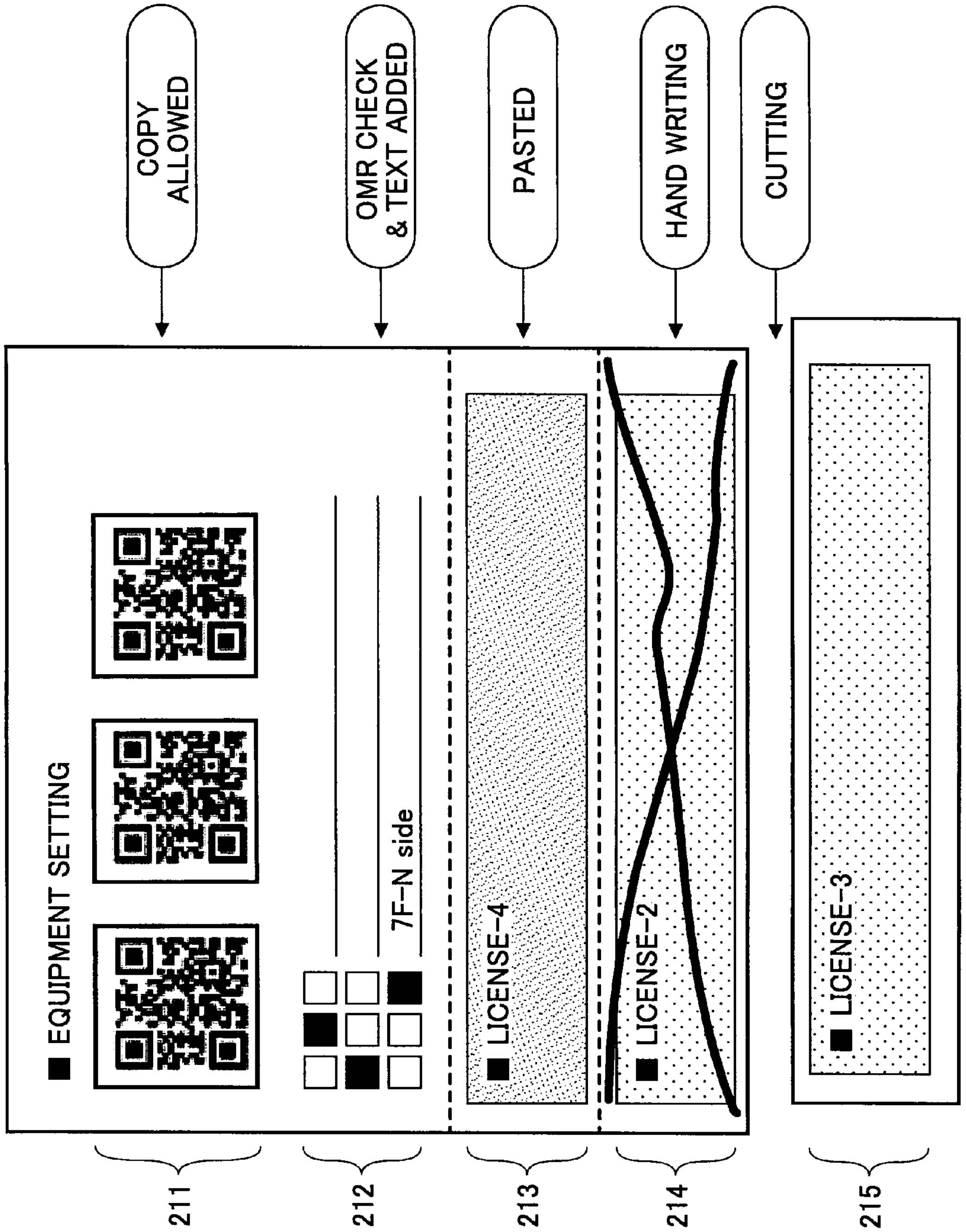
FIG. 6 is a diagram showing an example of processing of a printed recording sheet.

FIG. 6 shows an example of processing of a printed recording sheet. As shown in FIG. 6, marking or checking is inserted to the mark entry column of the area 212 on the recording sheet. A text is added to the text entry column on the right side of the mark entry column of the area 212. A ground tint portion of the license information, cut out from a similar recording sheet printed by another MFP of the existing equipment, is pasted to the area 213.

A hand-writing is added to the license information in the area 214, which indicates the impossibility of use of the license information concerned. And the portion of the license information in the area 215 is cut off as shown. Alternatively, the portion of the setting information in the area 211 may be printed on a similar recording sheet by another MFP, so that it is copied and pasted to this portion.

Figure 7:
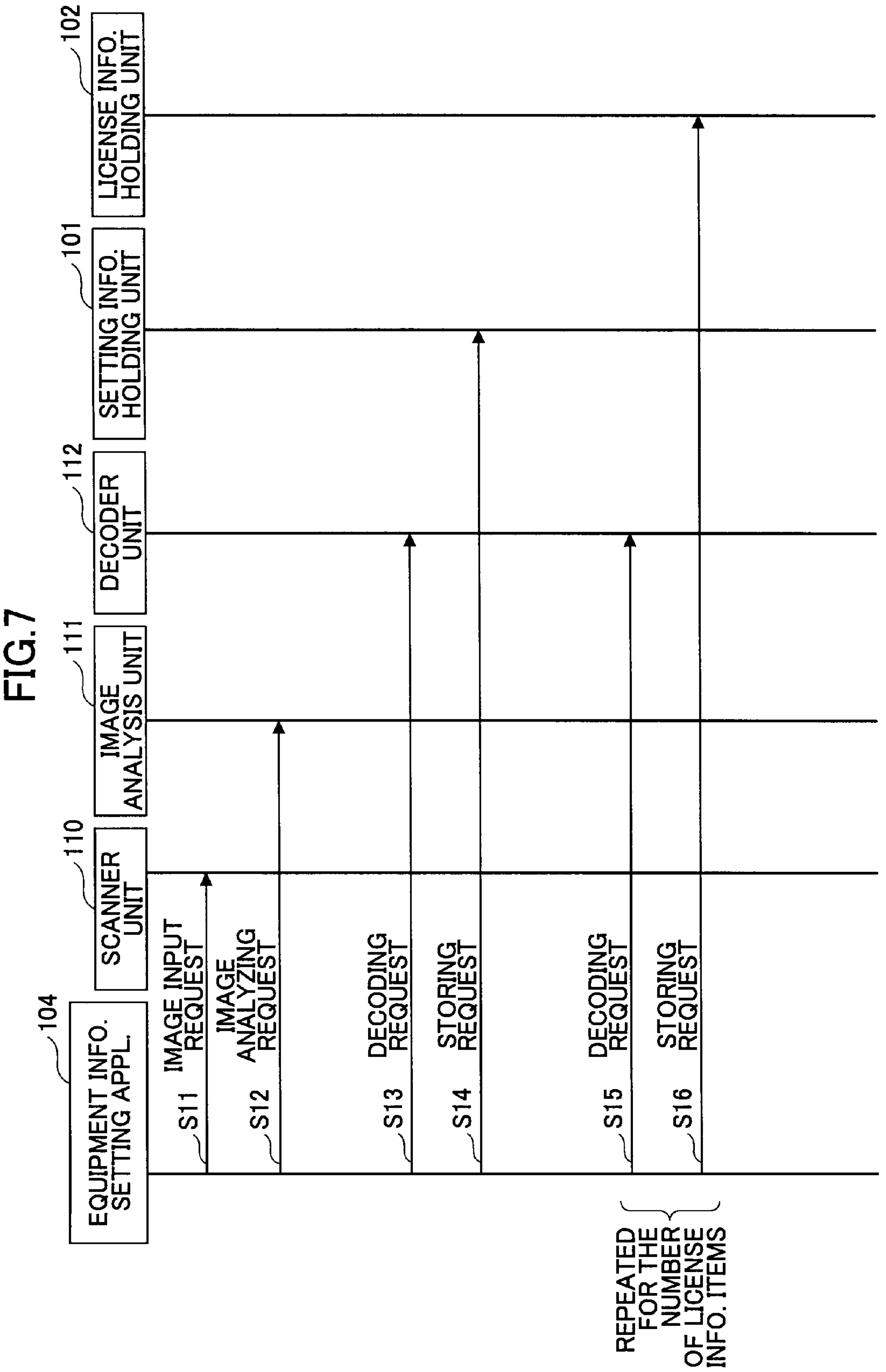
FIG. 7 is a sequence diagram for explaining an example of equipment-information setting processing.

FIG. 7 is a sequence diagram for explaining an example of equipment-information setting processing. The processing of FIG. 7 is started after a printed recording sheet on which the equipment information is printed (and entry or processing is performed, if needed) is set to a MFP 100 on the side of the new equipment.

Upon start of the processing of FIG. 7, the equipment information setting application 104 of the MFP 100 on the side of the new equipment requests inputting of image data of the printed recording sheet to the scanner unit 110 (step S11), and requests analysis of the inputted image data to the image-analysis unit 111 (step S12).

Figure 8:
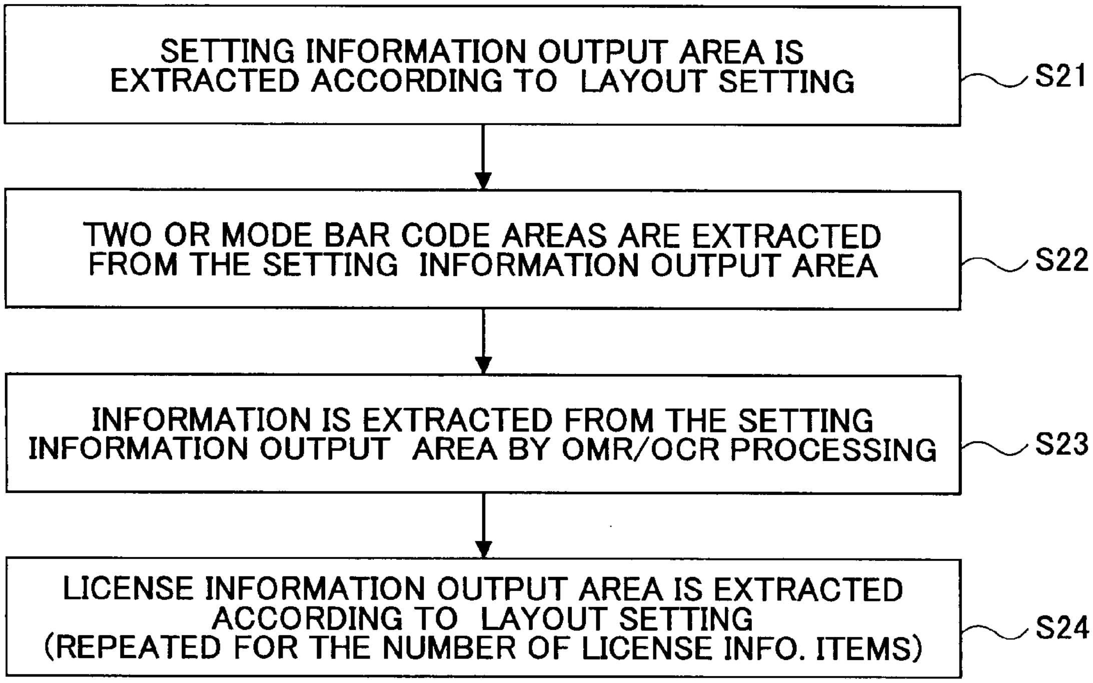
FIG. 8 is a flowchart for explaining an example of processing performed by an image-analysis unit.

FIG. 8 is a flowchart for explaining an example of processing performed by the image-analysis unit 111. As shown in FIG. 8, when the image-analysis unit 111 receives an image-analysis request, the image-analysis unit 111 extracts a setting information output area according to the layout setting which indicates the position of each item on the recording sheet (step S21), and extracts two or more bar code areas from the extracted setting information output area (step S22).

And the image-analysis unit 111 extracts information from the extracted setting information output area through the OMR or OCR processing (step S23). Subsequently, the image-analysis unit 111 extracts a license information output area according to the layout setting. The above processing is repeated for the number of license information items concerned until no further license information output area is extracted (step S24).

Referring back to FIG. 7, the equipment-information setting application 104 requests decoding of the codes of setting information to the decoder unit 112 (step S13). And the equipment-information setting application 104 requests storing of the decoded setting information to the setting information holding unit 101 (step S14).

Subsequently, the equipment-information setting application 104 requests decoding of the codes of license information to the decoder unit 112 (step S15). And the equipment-information setting application 104 requests storing of the decoded license information to the license information holding unit 102 (step S16).

The decoding request and the storing request of the license information are repeated for the number of license information items concerned.

Figure 9:
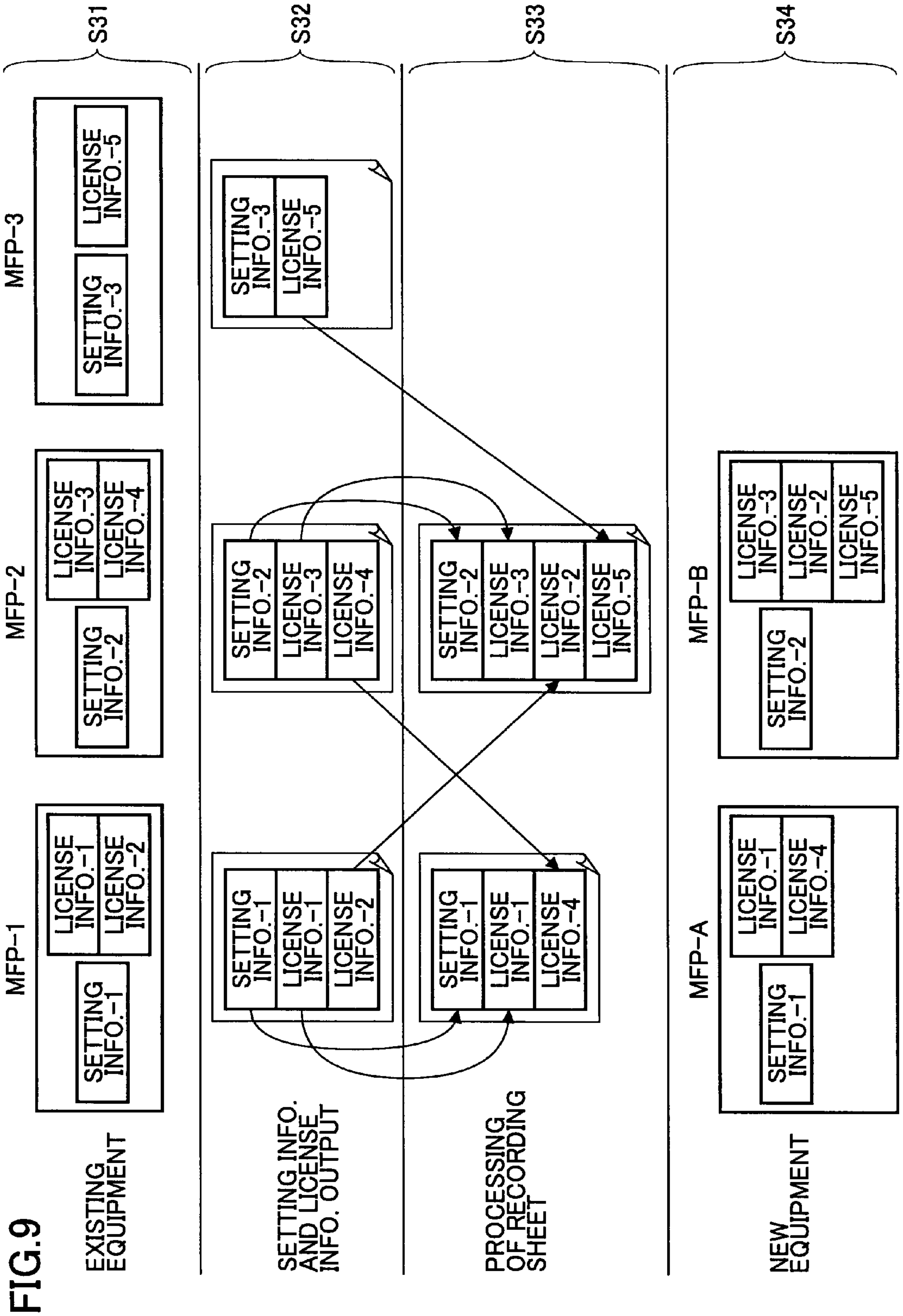
FIG. 9 is a diagram showing an example of shifting and integration of equipment information.

FIG. 9 shows an example of shifting and integration of equipment information. In the example of FIG. 9, the equipment information is taken over from three computer apparatuses MFP-1, MFP-2, and MFP-3 of the existing equipment to two computer apparatuses MFP-A and MFP-B of the new equipment.

First, the computer apparatus MFP-1 of the existing equipment is in the state containing setting information-1, license information-1, and license information-2, the computer apparatus MFP-2 of the existing equipment is in the state containing setting information-2, license information-3, and license information-4, and the computer apparatus MFP-3 of the existing equipment is in the state containing setting information-3 and license information-5 (step S31).

In this state, the equipment information printing processing is performed by each of the computer apparatuses MFP-1, MFP-2, and MFP-3 of the existing equipment, so that each equipment information is printed on the recording sheet (step S32).

Subsequently, processing of the recording sheet, such as patching, is performed so that a recording sheet containing the setting information-1, the license information-1 and the license information-4, and a recording sheet having containing the setting information-2, the license information-3, the license information-2 and the license information-5 are produced (step S33).

And these recording sheets are set to the scanner units 110 of the computer apparatuses MFP-A and MFP-B of the new equipment, respectively, and the equipment-information setting processing is performed so that each equipment information item is stored into the computer apparatuses MFP-A and MFP-B of the new equipment (step S34).

Figure 10A:
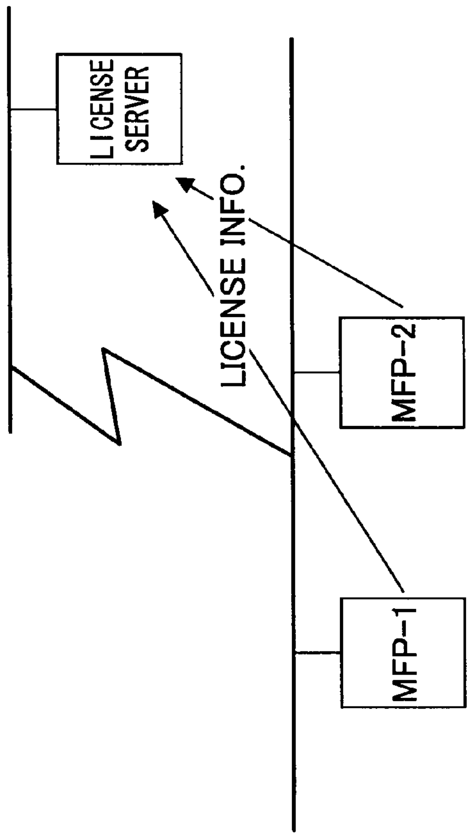
FIG. 10A and FIG. 10B are diagrams showing examples of license management.
Figure 10B:
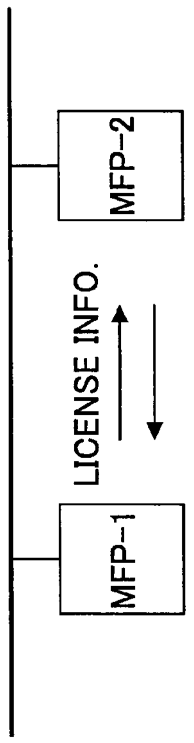

FIG. 10A and FIG. 10B are diagrams showing examples of license management. In FIG. 10A and FIG. 10B, the mechanism for avoiding duplication of the license information due to repeated use of a recording sheet on which the equipment information is printed with a plurality of computer apparatuses of the new equipment is shown.

In the example of FIG. 10A, a license server is arranged on a WAN (wide area network) or LAN (local area network). The license information is sent from each of the MFP-1 and the MFP-2 to the license server, and activation of corresponding application programs is carried out. The activation of the corresponding application programs is carried out by setting the corresponding application programs in a usable state after an authorized license of each program is authenticated.

When an activation request containing a number of license information items exceeding the proper number of licenses is transmitted to the license server, the license server refuses acceptance of the activation request from the MFP concerned.

In the example of FIG. 10B, the license information is transmitted between two MFPs: the MFP-1 and the MFP-2, and it is determined whether the received license information is the same as that contained in the MFP concerned.

When the result of determination indicates that it is the same license information, an alert is sent back, or use of the license information by one of the two MFPs is made invalid.

The term of validity may be included in the code information at the time of printing of the equipment information. In such a case, when the current time is not within the term of validity, execution of the equipment-information setting processing is not permitted. Thereby, it is possible to prevent the acceptance of an activation request containing a number of license information items exceeding the proper number of licenses.

A second operation pattern of the computer apparatus of the invention will be explained. The second operation pattern is applied to a case in which a part of license information is taken over from source equipment to destination equipment.

Figure 11:
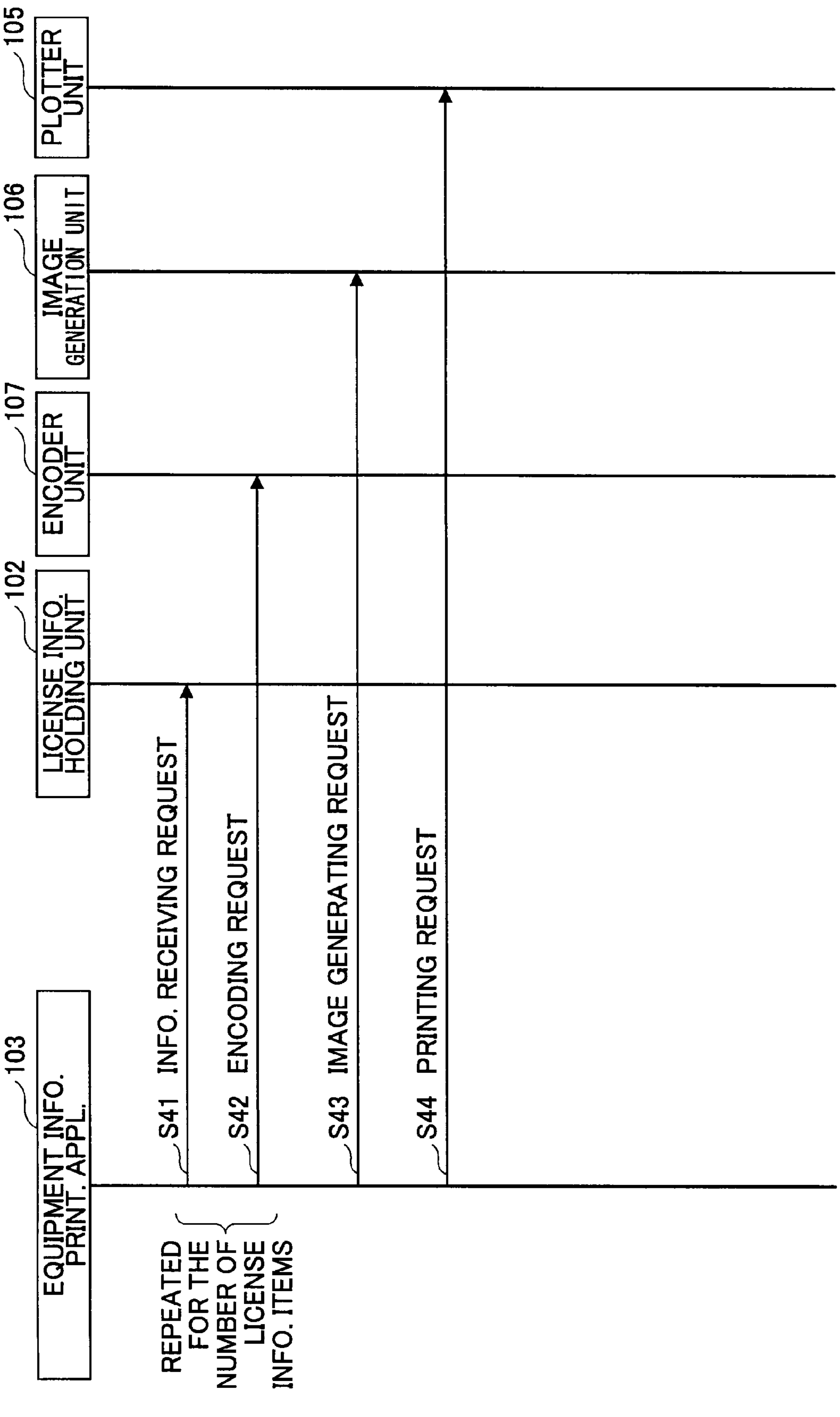
FIG. 11 is a sequence diagram for explaining an example of license-information printing processing.

FIG. 11 is a sequence diagram for explaining an example of license information printing processing. Upon start of the processing of FIG. 11, the equipment information printing application 103 of the MFP 100 of the source equipment requests receiving of license information to the license information holding unit 102 (step S41). The equipment information printing application 103 requests encoding of the received license information into a ground tint or the like to the encoder unit 107 (step S42). The license-information receiving request and the encoding request are repeated for the number of license information items concerned.

Subsequently, the equipment information printing application 103 requests generation of image data including the encoded license information to the image generation unit 106

(step S43). And the equipment information printing application 103 requests printing of the generated image data to the plotter unit 105 (step S44).

FIG. 12 is a diagram showing an example of a printed recording sheet. In an area 221 of the recording sheet of FIG. 12, an explanatory note: such as "License List: Please fill in boxes of the license information to be shifted with black. Please scan this list by the source equipment and the destination equipment" is printed.

In an area 223 on the left-hand side of an area 222 of the recording sheet of FIG. 12, a set of check boxes for entry, a set of program names of application programs, and a set of character information indicating the contents of license information, such as term-of-validity, model, and machine No., are printed. And, in an area 224 on the right-hand side of the area 222, a set of the license information items coded by a ground tint are printed.

FIG. 13 shows an example of the entry to the printed recording sheet of FIG. 12. In the area 222 of the recording sheet of FIG. 13, the state where check boxes 225 and 226 in front of the program names which are to be shifted are filled in with black is illustrated.

By scanning this recording sheet to which the entry is made by the source equipment and the destination equipment, the corresponding license information (PROG-2 and PROG-3) will be deleted by the source equipment, and the corresponding license information (PROG-2 and PROG-3) will be added by the destination equipment.

Figure 14:
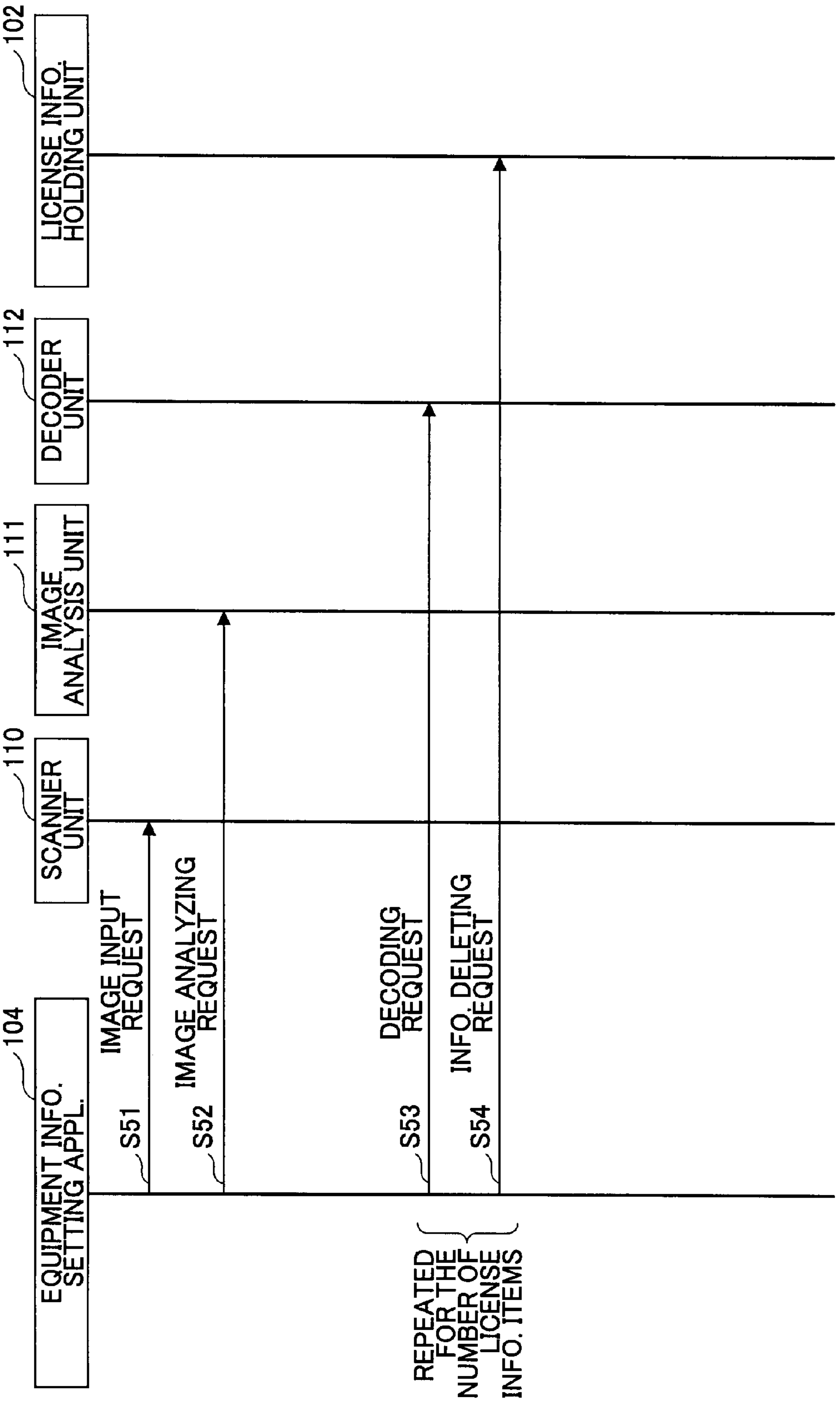
FIG. 14 is a sequence diagram for explaining an example of license-information deleting processing performed by the existing equipment.

FIG. 14 is a sequence diagram for explaining an example of license-information deleting processing performed by the MFP of the source equipment. The processing of FIG. 14 is started after a printed recording sheet on which the license information is printed and specifications of the application programs to be shifted are filled in is set to the MFP of the source equipment.

Upon start of the processing of FIG. 14, the equipment-information setting application 104 of the MFP 100 of the source equipment requests inputting of image data of the recording sheet to the scanner unit 110 (step S51). The equipment-information setting application 104 requests analysis of the inputted image data to the image-analysis unit 111 (step S52). The processing performed by the image-analysis unit 111 is essentially the same as that described above with reference to FIG. 8, and a description thereof will be omitted.

Subsequently, the equipment-information setting application 104 requests decoding of the codes of license information to the decoder unit 112 (step S53). And the equipment-information setting application 104 requests deletion of the decoded license information to the license-information holding unit 102 (step S54). The license-information decoding request and the deleting request are repeated for the number of license information items concerned.

Figure 15:
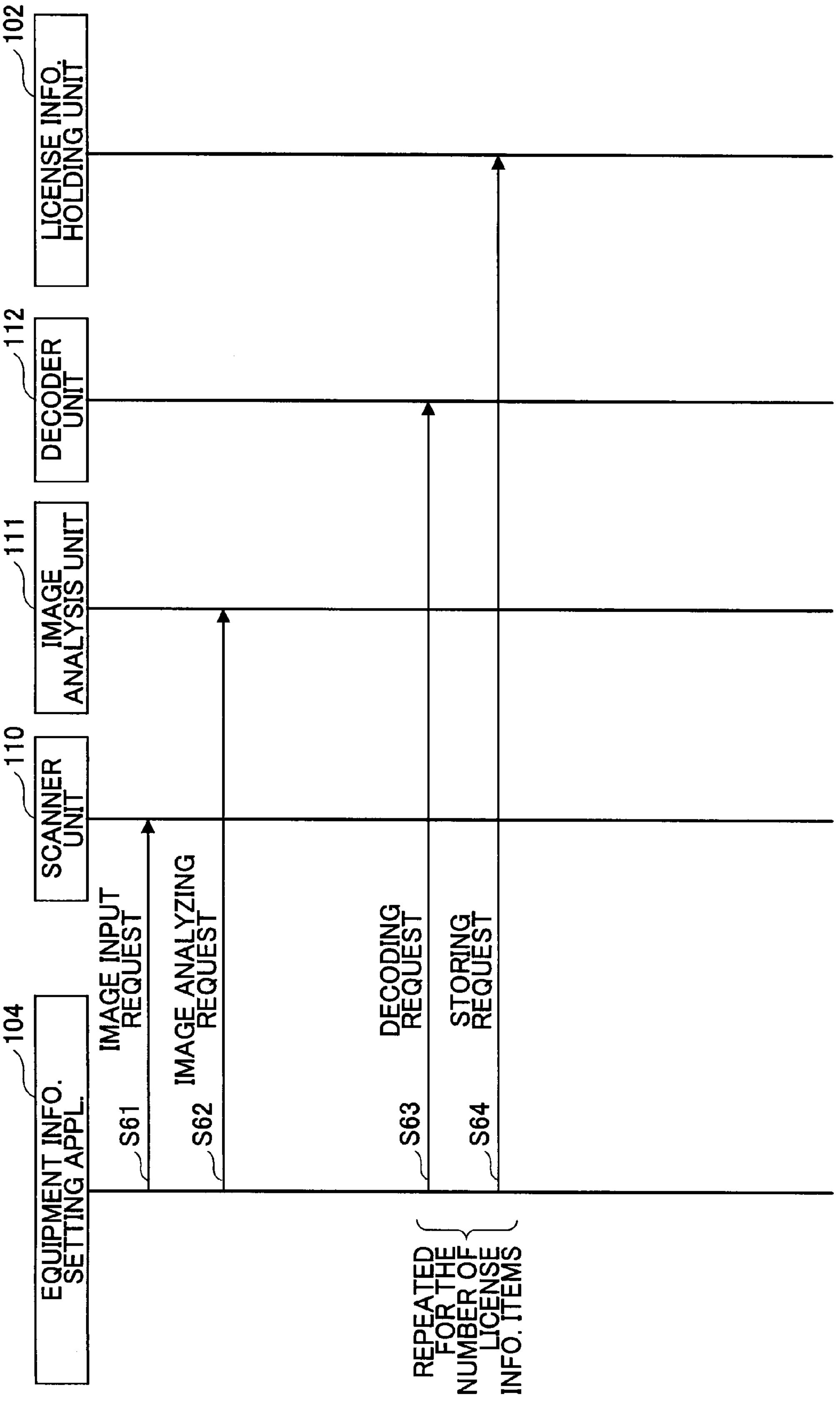
FIG. 15 is a sequence diagram for explaining an example of license-information setting processing performed by the new equipment.

FIG. 15 is a sequence diagram for explaining an example of the license information setting processing performed by the MFP of the destination equipment. The processing of FIG. 15 is started after a printed recording sheet on which the license information is printed and specifications of the application programs to be shifted are filled in is set to the MFP of the destination equipment.

Upon start of the processing of FIG. 15, the equipment-information setting application 104 of the MFP 100 of the destination equipment requests inputting of image data of the recording sheet to the scanner unit 110 (step S61). The equipment-information setting application 104 requests analysis of the inputted image data to the image-analysis unit 111 (step S62). The processing performed by the image-analysis unit 111 is essentially the same as that described above with reference to FIG. 8, and a description thereof will be omitted.

Subsequently, the equipment-information setting application 104 requests decoding of the codes of license information to the decoder unit 112 (step S63). And the equipment-information setting application 104 requests storing of the decoded license information to the license information holding unit 102 (step S64). The license-information decoding request and the storing request are repeated for the number of license information items concerned.

In the foregoing, the case in which the license information to be shifted is deleted by the device of the source equipment, and thereafter the license information being shifted is added by the device of the destination equipment has been explained. Alternatively, the license information being shifted may be first added by the device of the destination equipment, and thereafter the license information to be shifted may be deleted by the device of the source equipment.

A third operation pattern of the computer apparatus of the invention will be explained. The third operation pattern is applied to a case in which the license information is set up to the computer apparatus when the application programs are installed to the computer apparatus.

Figure 16:
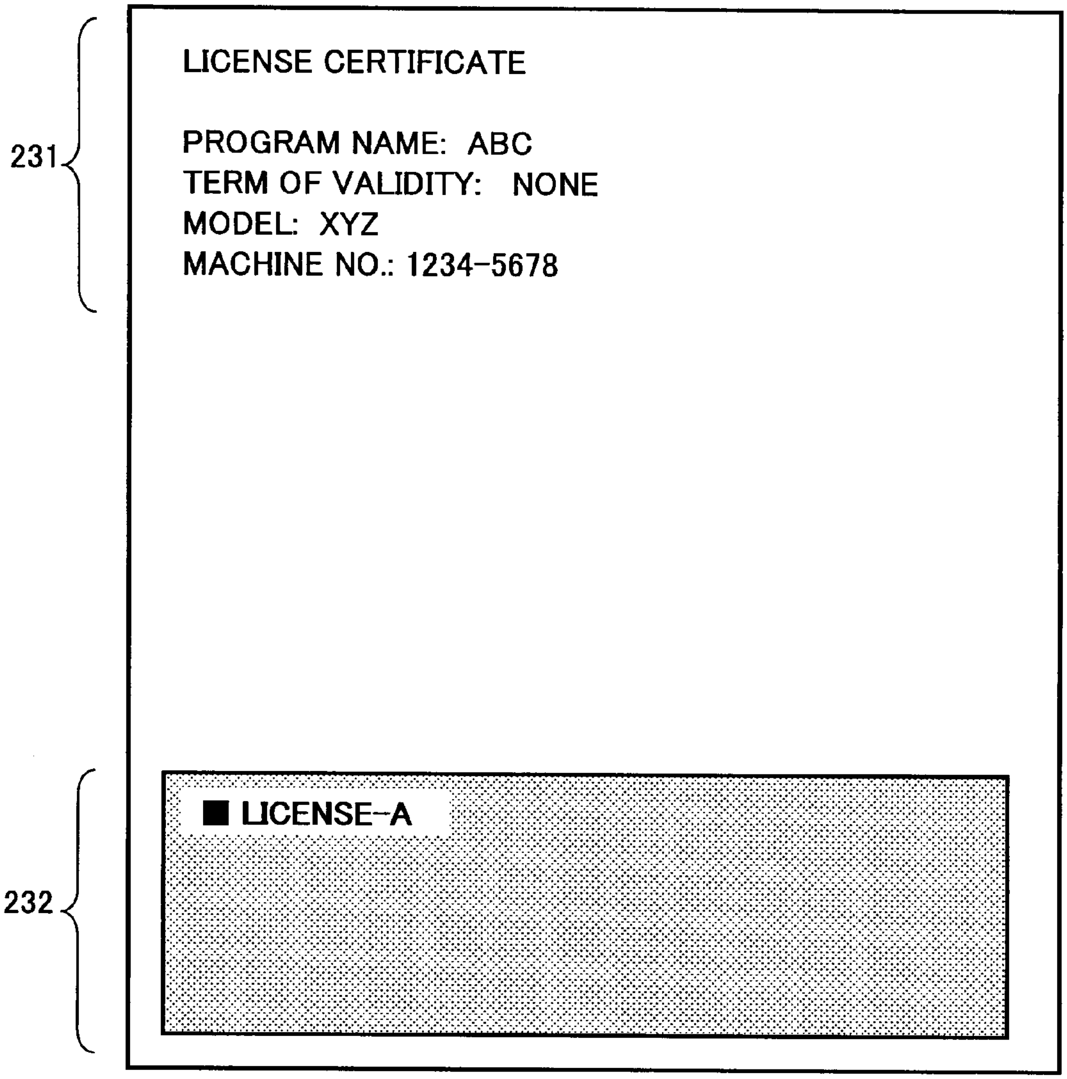
FIG. 16 is a diagram showing an example of a license certificate.

Suppose that, in this embodiment, a license certificate corresponding to automatic setting of license information is published beforehand on the side of an application-program provider. FIG. 16 shows an example of a license certificate. In an area 231 of the license certificate of FIG. 16, the title "license certificate", a program name of the application program, and the character information indicating the contents of the license information, such as term-of-validity, model, and machine No., are printed. And in an area 232 of the license certificate of FIG. 16, the license information item coded by a ground tint is printed.

Figure 17:
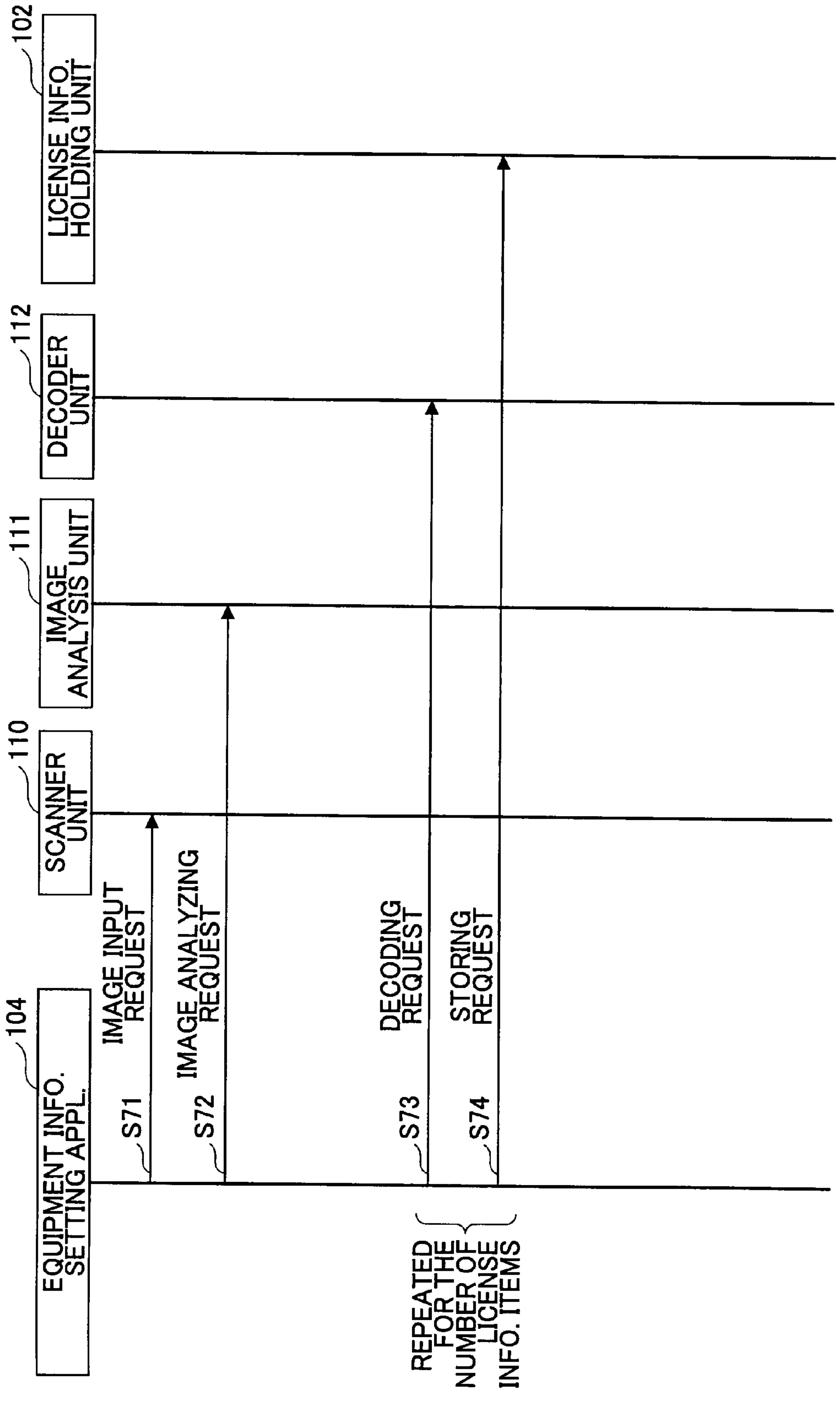
FIG. 17 is a sequence diagram for explaining an example of license-information setting processing.

FIG. 17 is a sequence diagram for explaining an example of license information setting processing. The processing of FIG. 17 is started after a license certificate on which the license information is printed is set to the MFP.

Upon start of the processing of FIG. 17, the equipment-information setting application 104 of the MFP 100 requests inputting of image data of the license certificate to the scanner unit 110 (step S71). The equipment-information setting application 104 requests analysis of the inputted image data to the image-analysis unit 111 (step S72). The processing performed by the image-analysis unit 111 is essentially the same as that described above with reference to FIG. 8.

Subsequently, the equipment information setting application 104 requests decoding of the codes of license information to the decoder unit 112 (step S73). And the equipment information setting application 104 requests storing of the decoded license information to the license information holding unit 102 (step S74). The license-information decoding request and the storing request are repeated for the number of license information items concerned.

A fourth operation pattern of the computer apparatus of the invention will be explained. The fourth operation pattern is applied to a case in which license information corresponding to a predetermined application program is deleted when the predetermined application program is uninstalled from the MFP.

Figure 18:
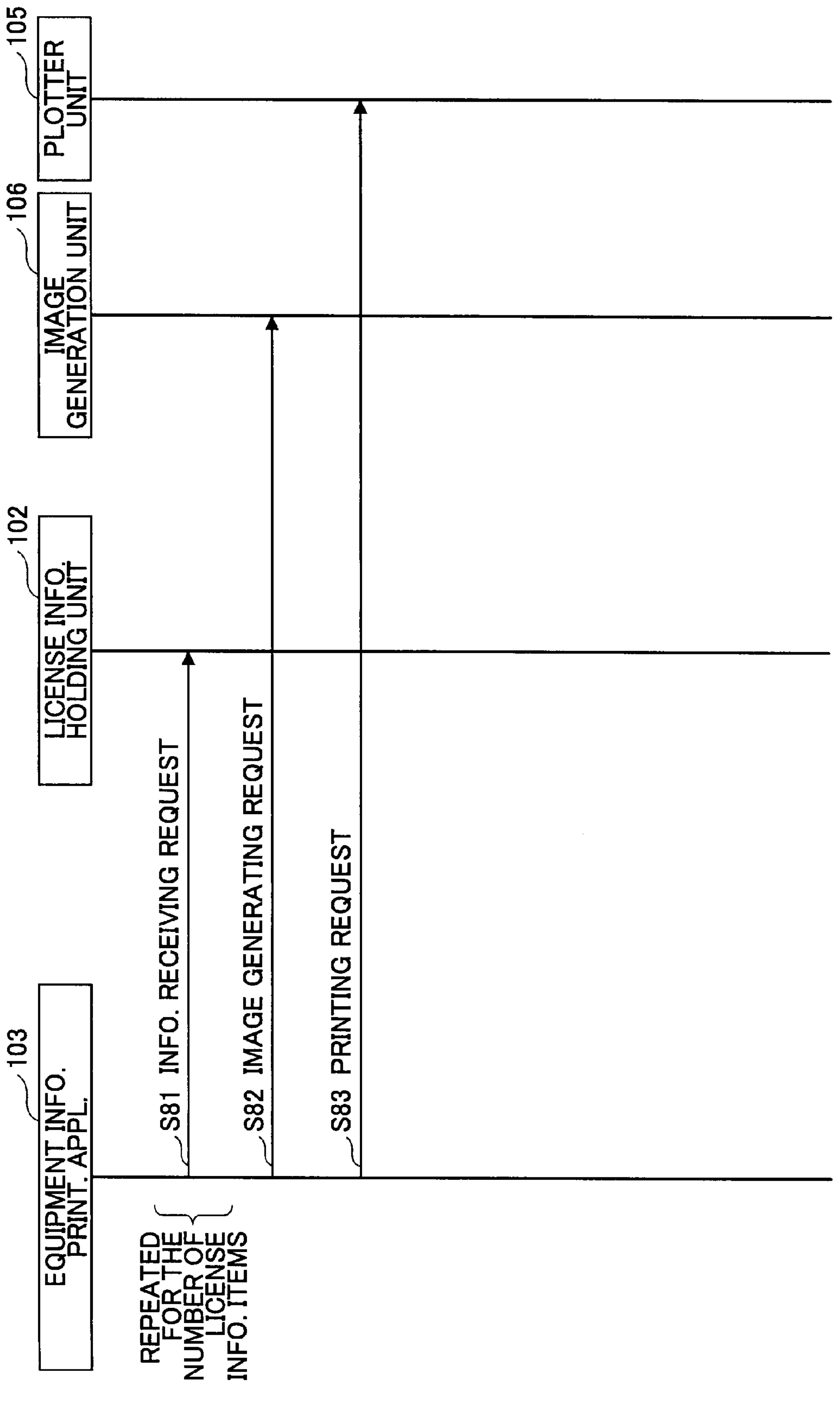
FIG. 18 is a sequence diagram for explaining an example of license-information printing processing.

FIG. 18 is a sequence diagram for explaining an example of license-information printing processing.

Upon start of the processing of FIG. 18, the equipment information printing application 103 of the MFP 100 requests receiving of license information to the license information holding unit 102 (step S81). The receiving request of the license information is repeated for the number of license information items concerned. Since it is not necessary to newly set up license information when uninstalling the application program, encoding of image data to a ground tint or the like is not needed.

Subsequently, the equipment information printing application 103 requests generation of image data of a license list to the image generation unit 106 (step S82). On this license list, the application programs to be deleted are specified, which will be mentioned later. And the equipment information printing application 103 requests printing of the generated image data to the plotter unit 105 (step S83).

Figure 19:
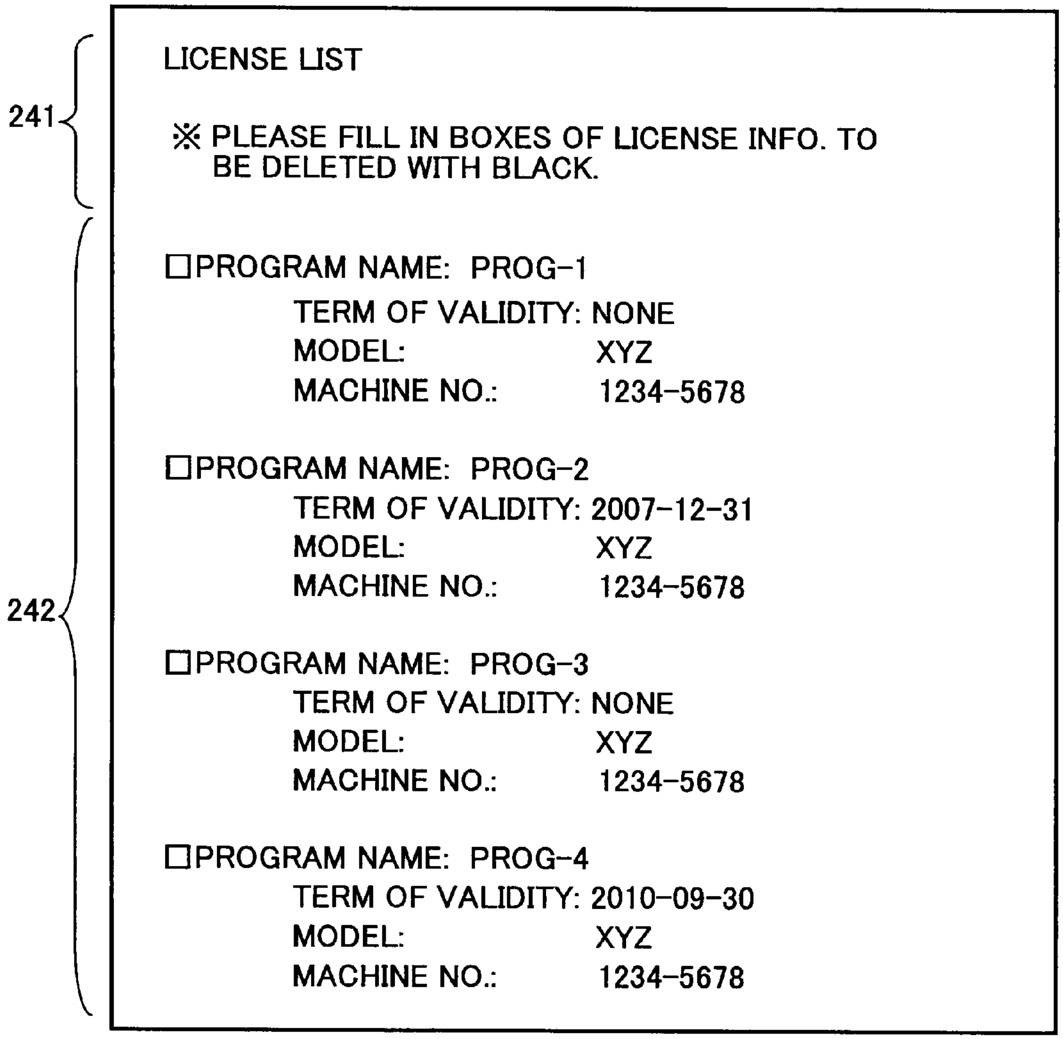
FIG. 19 is a diagram showing an example of a printed recording sheet.

FIG. 19 shows an example of a printed recording sheet. In an area 241 of the recording sheet of FIG. 19, an explanatory note: such as "License List: Please fill in boxes of the license information to be deleted with black" is printed. In an area 242 of the recording sheet of FIG. 19, a set of check boxes for entry, a set of program names of application programs, and a set of character information indicating the contents of license information, such as term-of-validity, model, and machine No. are printed.

Figure 20:
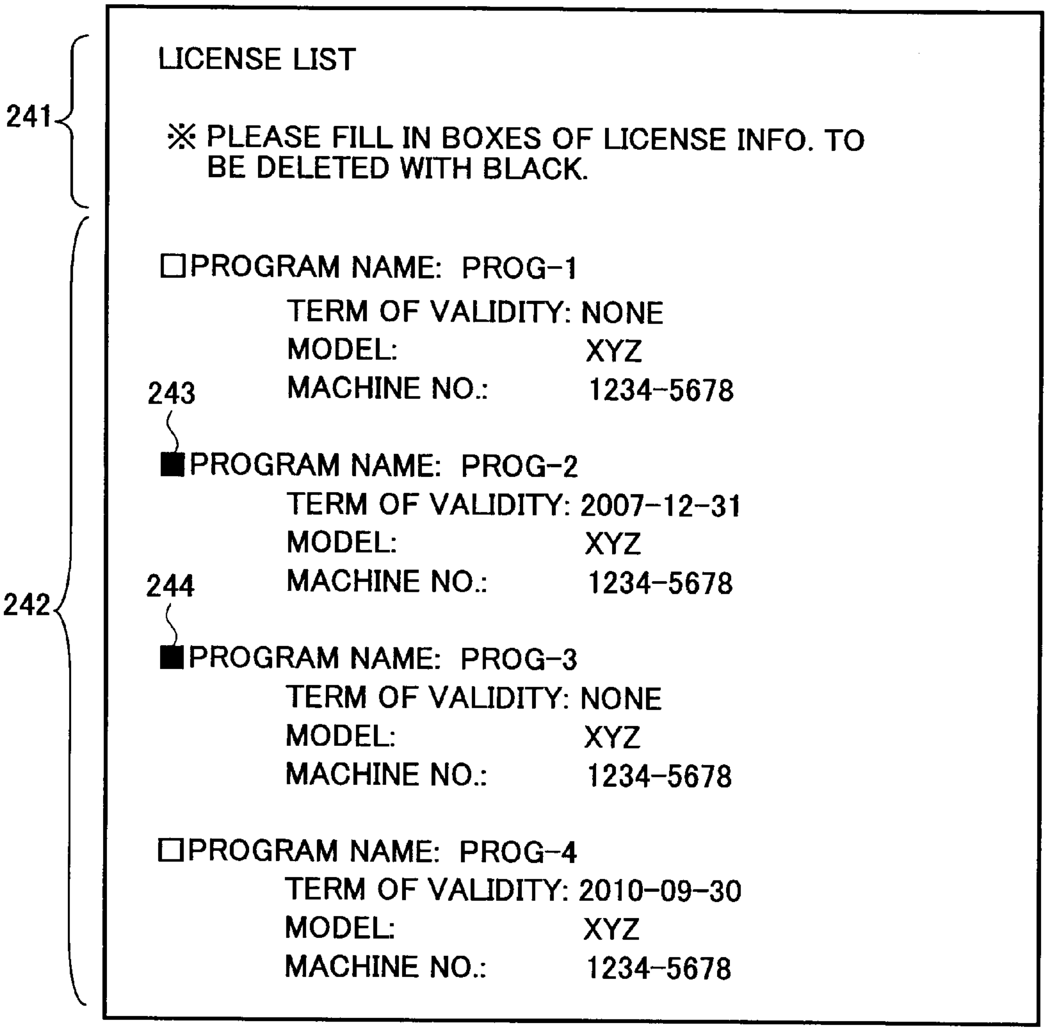
FIG. 20 is a diagram showing an example of the entry to the printed recording sheet.

FIG. 20 shows an example of the entry to the printed recording sheet of FIG. 19. In the area 242 of the recording sheet of FIG. 20, the state where check boxes 243 and 244 in front of the program names which are to be deleted are filled in with black is illustrated.

By scanning this recording sheet to which the entry is made by the equipment, the corresponding license information (PROG-2 and PROG-3) will be deleted by the equipment (or the device where the recording sheet is printed) when the application programs are uninstalled from the equipment.

Figure 21:
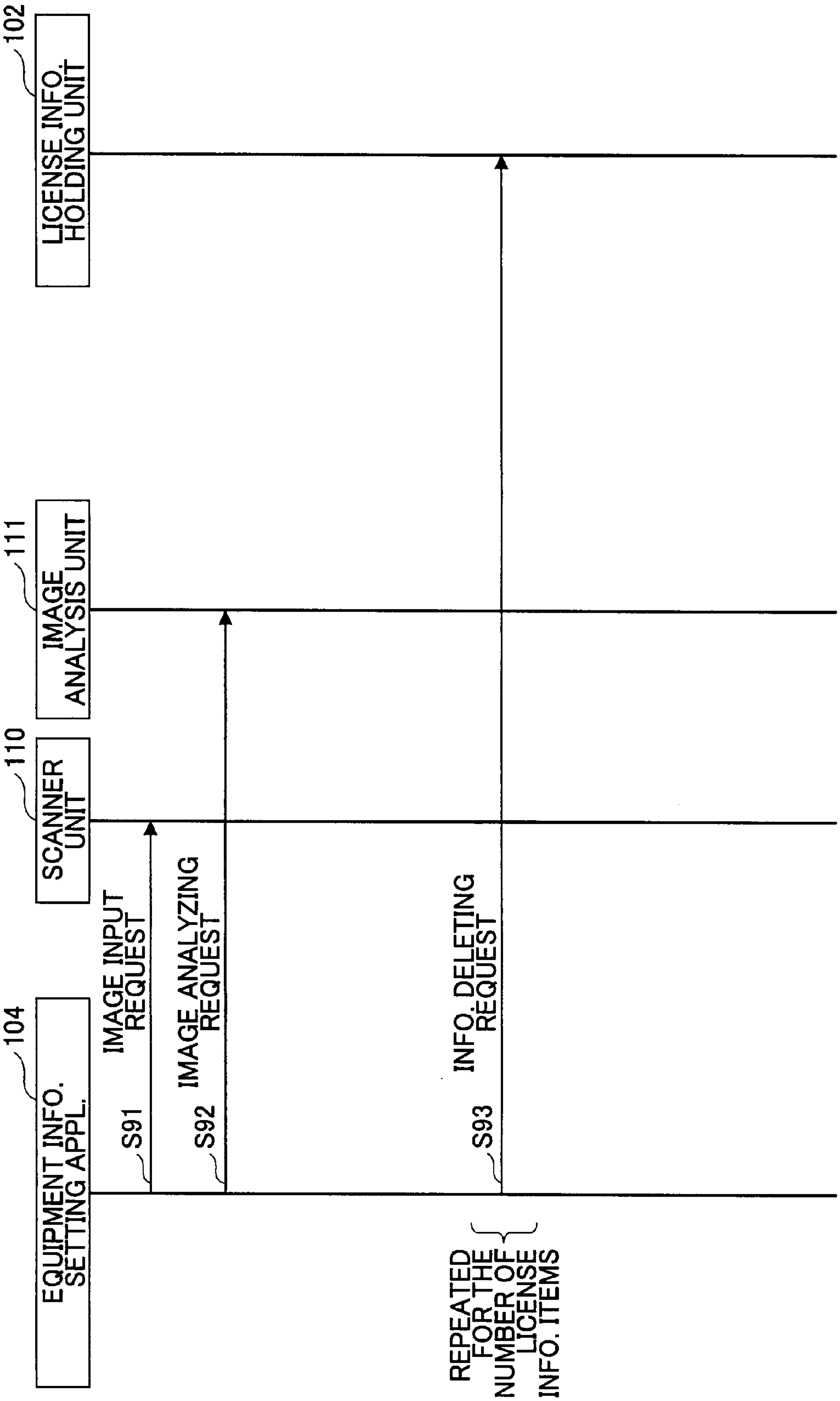
FIG. 21 is a sequence diagram for explaining an example of license-information setting processing.

FIG. 21 is a sequence diagram for explaining an example of license information setting processing. The processing of FIG. 21 is started after a printed recording sheet (license list) on which specifications of the application programs to be uninstalled are filled in is set to the MFP 100.

Upon start of the processing of FIG. 21, the equipment-information setting application 104 of the MFP 100 requests inputting of the image data of the recording sheet (license list) to the scanner unit 110 (step S91). The equipment-information setting application 104 requests analysis of the inputted image data to the image-analysis unit 111 (step S92).

The processing by the image-analysis unit 111 is essentially the same as that described above with reference to FIG. 8, and a description thereof will be omitted. By this image analysis, the application programs to be uninstalled are specified by the check boxes being filled in on the recording sheet.

Subsequently, the equipment-information setting application 104 requests deletion of the license information of the specified application programs to the license information holding unit 102 (step S93). The license-information deleting request is repeated for the number of license information items concerned.

The present invention is not limited to the above-described embodiments, and variations and modifications may be made without departing from the scope of the present invention.

The present application is based on and claims the benefit of priority of Japanese patent application No. 2006-130551, filed on May 9, 2006, and Japanese patent application No. 2007-104049, filed on Apr. 11, 2007, the entire contents of which are hereby incorporated by reference.

What is claimed is:

1. A computer apparatus comprising:

an equipment-information holding unit which holds equipment information which contains setting information of equipment of the computer apparatus and license information for using the equipment;

an encoder unit which encodes the equipment information held by the equipment-information holding unit such that the setting information is encoded into a bar code and the license information is encoded into a ground tint;

an image-data generating unit which generates image data from the encoded equipment information held by the equipment-information holding unit;

a plotter unit which prints the generated image data on a sheet in a predetermined form in response to a request by the image-data generating unit;

an equipment-information setting unit which stores the encoded equipment information into the equipment-information holding unit based on second image data read from a second printed sheet, from another computer apparatus, on which second equipment information is printed; and a processing unit which authorizes the computer apparatus based on the stored encoded equipment information, wherein the another computer apparatus generates and prints the second printed sheet.

2. The computer apparatus according to claim 1, further comprising:

an equipment-information setting application controlling processing to read the second printed sheet on which the second equipment information is printed, and to perform storing of the second equipment information;

a scanner unit performing optical reading of the second printed sheet;

an image-analysis unit analyzing the read image data and performing recognition of marks and characters to extract codes of the second equipment information; and a decoder unit decoding the codes of the second equipment information into the equipment information.

3. The computer apparatus according to claim 1, wherein the plotter unit of the computer apparatus being existing equipment prints the equipment information, held by the equipment-information holding unit, on the sheet in the predetermined form, and wherein a second equipment-information setting unit of the another computer apparatus being new equipment stores the equipment information into a second equipment-information holding unit of the new equipment based on image data read from the sheet.

4. The computer apparatus according to claim 1, wherein the plotter unit of the computer apparatus being source equipment prints the license information, held by the equipment-information holding unit, on the sheet in the predetermined form, and wherein a second equipment-information setting unit of the another computer apparatus being destination equipment stores the license information into a second equipment-information holding unit of the destination equipment based on image data read from the sheet on which the license information to be transferred to the destination equipment is specified.

5. The computer apparatus according to claim 1, wherein the equipment-information setting unit stores the license information into the equipment information holding unit based on image data read from a license certificate.

6. The computer apparatus according to claim 1, wherein the equipment-information setting unit deletes the license information in the equipment-information holding unit based on image data read from the sheet on which the license information being deleted is specified.

7. The computer apparatus according to claim 1, wherein the another computer apparatus includes, a second equipment-information holding unit which holds the second equipment information which contains second setting information of second equipment of the another computer apparatus and second license information for using the second equipment, a second image-data generating unit which generates the second image data from the second equipment information held by the second equipment-information holding unit, a second plotter unit which prints the generated second image data on the second printed sheet in a predetermined form in response to a request by the second image-data generating unit, and a second equipment-information setting unit which stores the second equipment information into the second equipment-information holding unit.

8. An equipment-information management method for use in a computer apparatus, the method comprising:

encoding equipment information which contains setting information of equipment of the computer apparatus and license information for using the equipment, such that the setting information is encoded into a bar code and the license information is encoded into a ground tint;

generating image including the encoded equipment information;

printing the generated image data including equipment information on a sheet in a predetermined form;

storing the printed generated image data including the encoded equipment information into the equipment of the computer apparatus or equipment of another computer apparatus; and authorizing the computer apparatus or the another computer apparatus based on the stored equipment information.

9. The equipment-information management method according to claim 8, further comprising:

performing processing on the sheet on which the equipment information is printed, through copying, writing, patching or rewriting.

10. The equipment-information management method according to claim 8, further comprising:

performing optical reading of the sheet on which the equipment information is printed;

analyzing the read image data and performing recognition of marks and characters to extract codes of the equipment information; and decoding the codes of the equipment information into the equipment information.

11. The equipment-information management method according to claim 8, wherein the computer apparatus being existing equipment prints the equipment information on the sheet in the predetermined form, and the another computer apparatus being new equipment stores the equipment information based on image data read from the sheet.

12. The equipment-information management method according to claim 8, wherein the computer apparatus being source equipment prints the license information the sheet in the predetermined form, and the another computer apparatus being destination equipment stores the license information based on image data read from the sheet on which the license information to be transferred to the destination equipment is specified.

13. The equipment-information management method according to claim 8, wherein storing of the license information to the equipment of the computer apparatus is performed based on image data read from a license certificate.

14. The equipment-information management method according to claim 8, wherein the license information is deleted based on image data read from the sheet on which the license information being deleted is specified.

15. A printing system comprising:

a first computer apparatus including a first equipment-information holding unit which holds first equipment information which contains first setting information of first equipment of the first computer apparatus and first license information for using the first equipment, a first encoder unit which encodes the first equipment information held by the first equipment-information holding unit such that the first setting information is encoded into a first bar code and the first license information is encoded into a first ground tint, a first image-data generating unit which generates first image data from the encoded first equipment information held by the first equipment-information holding unit, a first plotter unit which prints the generated first image data on a first sheet in a predetermined form in response to a request by the first image-data generating unit, a first equipment-information setting unit which stores the first equipment information into the first equipment-information holding unit based on second image data read from a second printed sheet, from a second computer apparatus, on which second equipment information is printed, and a first processing unit which authorizes the first computer apparatus based on the stored encoded first equipment information; and the second computer apparatus including a second equipment-information holding unit which holds the second equipment information which contains second setting information of second equipment of the second computer apparatus and second license information for using the second equipment, a second encoder unit which encodes the second equipment information held by the second equipment-information holding unit such that the second setting information is encoded into a second bar code and the second license information is encoded into a second ground tint, a second image-data generating unit which generates the second image data from the encoded second equipment information held by the second equipment-information holding unit, a second plotter unit which prints the generated second image data on the second printed sheet in a predetermined form, in response to a request by the second image-data generating unit, a second equipment-information setting unit which stores the second equipment information into the second equipment-information holding unit based on third image data read from a third printed sheet, from a third computer apparatus, on which a third equipment information is printed, and a second processing unit which authorizes the second computer apparatus based on the stored second equipment information.

* * * * *